United States Patent
Kim

(10) Patent No.: US 7,800,711 B2
(45) Date of Patent: Sep. 21, 2010

(54) BACKLIGHT UNIT WITH LED LAMPS ARRAYED HORIZONTALLY ON PCB SPACED APART FROM LIGHT GUIDE PLATE AND HAVING REFLECTING PLATE THEREBELOW AND REFLECTING FILM DISPOSED PREDETERMINEDLY IN UPPER PORTION OF THE SPACE BETWEEN ARRAY AND GUIDE PLATE

(75) Inventor: Yong-Kun Kim, Songjeong-dong (KR)

(73) Assignee: LG. Display Co., Ltd., Seoul (KR)

( * ) Notice: Subject to any disclaimer, the term of this patent is extended or adjusted under 35 U.S.C. 154(b) by 333 days.

(21) Appl. No.: 11/967,653

(22) Filed: Dec. 31, 2007

(65) Prior Publication Data

US 2008/0225203 A1    Sep. 18, 2008

(30) Foreign Application Priority Data

Mar. 12, 2007  (KR)  .................... 10-2007-0023904

(51) Int. Cl.
*G02F 1/1335* (2006.01)
(52) U.S. Cl. .................... 349/65; 362/560; 362/615; 362/623; 362/624; 362/631
(58) Field of Classification Search .................. 349/65; 362/27, 560, 623, 624, 631
See application file for complete search history.

(56) References Cited

U.S. PATENT DOCUMENTS 6,285,420 B1 *  9/2001  Mizumo et al. ............... 349/65
7,030,944 B2 *  4/2006  Fujimoto ..................... 349/64

FOREIGN PATENT DOCUMENTS

| JP | 11-305226 | 11/1999 |
|----|-----------|---------|
| JP | 2005-135860 | 5/2005 |
| JP | 2006-066120 | 3/2006 |
| KR | 10-2007-0017837 A | 2/2007 |

OTHER PUBLICATIONS

Office Action issued in corresponding Korean Patent Application No. 10-2007-0023904; issued May 29, 2009.
Office Action issued in corresponding Korean Patent Application No. 10-2007-0023904; issued Nov. 27, 2009.

* cited by examiner

*Primary Examiner*—John Heyman
(74) *Attorney, Agent, or Firm*—Brinks Hofer Gilson & Lione

(57) ABSTRACT

A backlight unit comprises a reflecting plate, a light guide plate disposed over the reflecting plate, and a plurality of optic films disposed over the light guide plate. The backlight unit further comprises a lamp horizontally spaced apart from the light guide plate, and a reflecting film corresponding to an upper portion of a space between the light guide plate and the lamp.

12 Claims, 5 Drawing Sheets

## BACKLIGHT UNIT WITH LED LAMPS ARRAYED HORIZONTALLY ON PCB SPACED APART FROM LIGHT GUIDE PLATE AND HAVING REFLECTING PLATE THEREBELOW AND REFLECTING FILM DISPOSED PREDETERMINEDLY IN UPPER PORTION OF THE SPACE BETWEEN ARRAY AND GUIDE PLATE

CLAIM FOR PRIORITY

The present invention claims priority to Korean Patent Application No. 10-2007-0023904, filed Mar. 12, 2007, the entirety of which is hereby incorporated by reference

FIELD

The present invention relates to a liquid crystal display module, and more particularly, to a backlight unit and a liquid crystal display module including the backlight unit.

BACKGROUND

Among flat panel display (FPD) devices, a liquid crystal display (LCD) device has advantages in visibility, power consumption and heat emission as compared with a cathode ray tube (CRT). Accordingly, the LCD device has been the subject of recent research and development with a plasma display panel (PDP) and an electroluminescent display (ELD) as a next generation display unit for a mobile phone, a monitor of computer and a television.

LCD devices make use of optical anisotropy and polarization properties of liquid crystal molecules to produce images. Specifically, since the liquid crystal molecules have a definite alignment as a result of their long, thin shapes and are arranged to have initial pre-tilt angles, an alignment direction of the liquid crystal molecules can be controlled by applying an electric field. Accordingly, variations in the applied electric field influence the alignment of the liquid crystal molecules. Due to the optical anisotropy, the refraction of incident light depends on the alignment direction of the liquid crystal molecules. Thus, by properly controlling the applied electric field, an image that has a desired brightness can be produced.

Since an LCD device is a non-emissive type display device, an additional light source is required. Accordingly, a liquid crystal display module of an LCD device includes a liquid crystal display panel and a backlight unit disposed under the liquid crystal display panel. Light from the backlight unit is supplied to the liquid crystal display panel and images are displayed by adjusting transmittance of the light according to arrangement of liquid crystal molecules.

FIG. 1 is an exploded perspective view showing a liquid crystal display module according to the related art. In FIG. 1, a liquid crystal display module 5 includes a bottom frame 15, a main frame 40, a top frame 70, a liquid crystal display panel 45 and a backlight unit 10. The liquid crystal display panel 45 and the backlight unit 10 are surrounded by the bottom frame 15, the main frame 40 and the top frame 70. The backlight unit 10 disposed under the liquid crystal display panel 45 includes a reflecting plate 30, a light guide plate 25 over the reflecting plate 30, a plurality of optic films 35 over the light guide plate 25 and a light emitting diode (LED) array 60 at a side of the light guide plate 25. The backlight unit 10 including the LED array 60 may be referred to as an LED backlight unit.

The backlight unit 10 is disposed on the bottom frame 15 and one side of the bottom frame 15 may be used as a guide panel 75 where the LED array 60 is fixed. The guide panel 75 has a bent surface to cover the plurality of optic films 35.

FIG. 2A is a cross-sectional view showing a liquid crystal display module having an LED backlight unit according to the related art, and FIG. 2B is a perspective view showing an LED backlight unit according to the related art. In FIGS. 2A and 2B, an LED backlight unit includes a reflecting plate 30, a light guide plate 25, a plurality of optic films 35, an LED array 60 and a guide panel 75. The light guide plate 25 is disposed over the reflecting plate 30 and the plurality of optic films 35 is disposed over the light guide plate 25. In addition, the LED array 60 is disposed at a side of the light guide plate 25. The guide panel 75 where the LED array 60 is fixed has a bent surface to cover the plurality of optic films 35. A liquid crystal display panel 45 is disposed over the plurality of optic films 35. A bottom frame 15 wraps the reflecting plate 30 and is combined with the guide panel 75.

The LED array 60 is spaced apart from the light guide plate 25 to minimize an influence of heat from the LED array 60 on the plurality of optic films 35 and prevent a hot spot of the liquid crystal display panel 45. The LED array 60 includes a plurality of LED lamps 60a and an LED printed circuit board (PCB) 60b. The plurality of LED lamps 60a are fixed on the LED PCB 60b and the LED PCB 60b may include a metallic material. The reflecting plate 30 is disposed under the light guide plate 25 and the LED array 60. Light downwardly scattered at the light guide plate 25 is induced to re-enter the light guide plate 25 by the reflecting plate 30. In addition, the reflecting plate 30 extends under the LED array 60.

When an electric power is supplied to the liquid crystal display module, a voltage is applied to the LED array 60 by an inverter (not shown) to emit light and the light enters the light guide plate 25. The light emitted from the guide plate 25 passes through the plurality of optic films 35 and the liquid crystal display panel 45.

However, since the light guide plate 25 and the LED array 60 are spaced apart from each other, the light from the LED array 60 passes through an upper portion of a space between the light guide plate 25 and the LED array 60 to be absorbed by the guide panel 75 or to be scattered outside the plurality of optic films 35. As a result, light efficiency of the LED backlight unit is reduced.

FIG. 3 is a graph showing light efficiency and light loss of an LED backlight unit according to the related art. In FIG. 3, a horizontal axis represents a gap distance between a light guide plate and an LED array, and a vertical axis represents a light efficiency and a light loss. As the gap distance increases, the light efficiency decreases and the light loss increases such that the light efficiency is in inverse proportion to the light loss. Accordingly, the light efficiency and the light loss are further improved as the gate distance between the light guide plate and the LED array. For example, when the gap distance is about 0 mm, i.e., the light guide plate contacts the LED array, the light loss is about 1.9%.

However, when the gap distance is about 0 mm, the light guide plate may be deteriorated due to heat from the LED array. For example, the light guide plate may be colorized with yellow or may be deformed. In addition, light passing through the light guide plate may have deterioration in uniformity such as a stripe pattern due to straightness of light from the LED array.

Further, when the light guide plate is spaced apart from the LED array to prevent above disadvantages, light efficiency is reduced.

SUMMARY

In one embodiment, a backlight unit comprises a reflecting plate, a light guide plate disposed over the reflecting plate, and a plurality of optic films disposed over the light guide plate. The backlight unit further comprises a lamp horizontally spaced apart from the light guide plate, and a reflecting film corresponding to an upper portion of a space between the light guide plate and the lamp.

In another embodiment, a liquid crystal display module comprises a backlight unit. The backlight unit comprises a reflecting plate, a light guide plate disposed over the reflecting plate, and a plurality of optic films disposed over the light guide plate. The backlight unit further comprises a lamp horizontally spaced apart from the light guide plate, and a reflecting film corresponding to an upper portion of a space between the light guide plate and the lamp.

In yet another embodiment, a backlight unit comprises a light guide plate, a lamp horizontally spaced apart from the light guide plate, and a reflecting film corresponding to an upper portion of a space between the light guide plate and the lamp.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to preferred embodiments, examples of which are illustrated in the accompanying drawings.

Figure 4A:
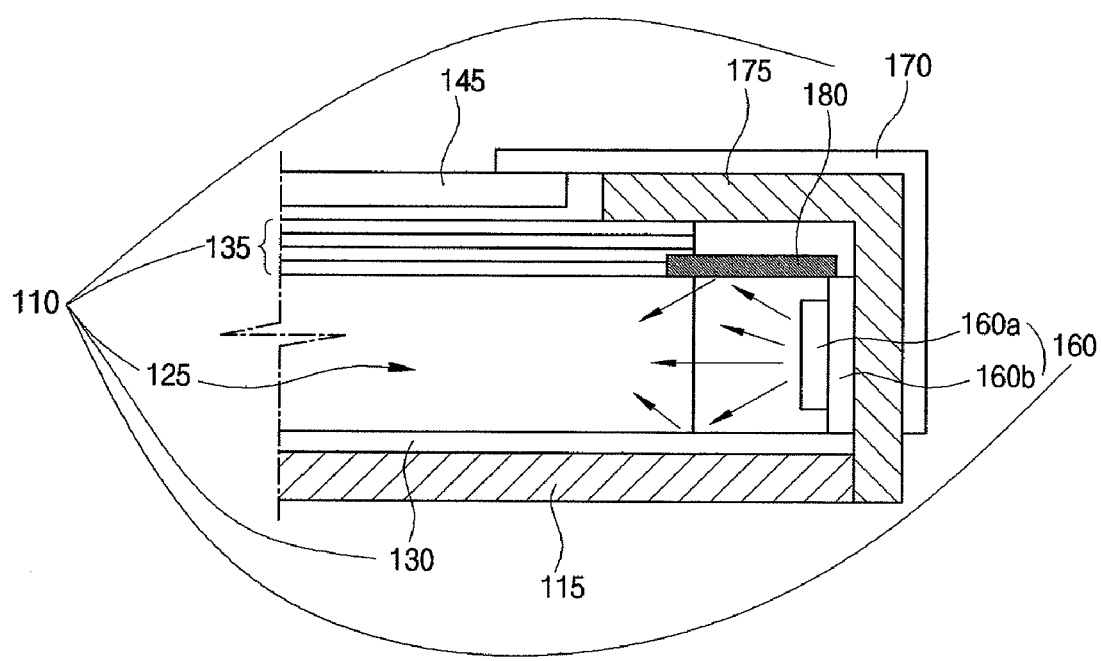
FIG. 4A is a cross-sectional view illustrating a liquid crystal display module according to a first embodiment.
Figure 4B:
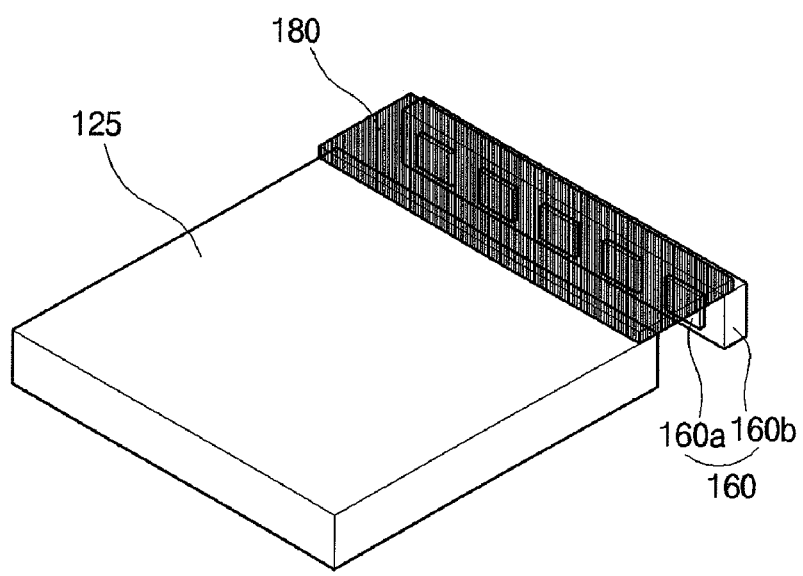
FIG. 4B is a perspective view illustrating a backlight unit of a liquid crystal display module according to a first embodiment.

FIG. 4A is a cross-sectional view illustrating a liquid crystal display module according to a first embodiment, and FIG. 4B is a perspective view illustrating a backlight unit of a liquid crystal display module according to a first embodiment.

In FIGS. 4A and 4B, a liquid crystal display module includes a liquid crystal display panel 145, a backlight unit 110, a bottom frame 115, a main frame (not shown), a top frame 170 and a guide panel 175. The backlight unit 110 is disposed over the bottom frame 115 and the liquid crystal display panel 145 is disposed over the backlight unit 110. The backlight unit 110 includes a reflecting plate 130, a light guide plate 125, a plurality of optic films 135, a light emitting diode (LED) array 160 and a reflecting film 180. The guide panel 175 surrounds the LED array 160 and the LED array 160 is fixed to the guide panel 175. The guide panel 175 has a bent surface covering edge portions of the plurality of optic films 135. Further, the guide panel 175 is combined with the bottom frame 115. Alternatively, the guide panel 175 may be combined with the main frame in another embodiment. Accordingly, the bottom frame 115 surrounds the reflecting plate 130 of the backlight unit 110, and the liquid crystal display panel 145 is disposed over the plurality of optic films 135. In addition, the main frame surrounds edge portions of the backlight unit 110 and the liquid crystal display panel 145, and the top frame 170 covers top edge portions of the liquid crystal display panel 145. The main frame may be combined with the top frame 170.

The LED array 160 is horizontally spaced apart from the light guide plate 125 to minimize an influence of heat from the LED array 160 on the plurality of optic films 135 and prevent a hot spot of the liquid crystal display panel 145. The LED array 160 includes a plurality of LED lamps 160a and an LED printed circuit board (PCB) 160b. The plurality of LED lamps 160a are fixed on the LED PCB 160b and the LED PCB 160b may include a metallic material. The reflecting plate 130 including a reflective material such as aluminum (Al) and aluminum alloy is disposed under the light guide plate 125 and the LED array 160. Light downwardly scattered at the light guide plate 125 is induced to re-enter the light guide plate 125 by the reflecting plate 130. In addition, the reflecting plate 130 extends under the LED array 160 to prevent light leakage, and the guide panel 175 has a bent surface to cover edge portions of the plurality of optic films 135.

Although not shown in FIGS. 4A and 4B, the plurality of optic films 135 may include a diffusing sheet, a prism sheet and a protective sheet. The diffusing sheet scatters light from the light guide plate 125 and the prism sheet concentrates light from the diffusing sheet to supply uniform planar light to a surface of the liquid crystal display panel 145.

Furthermore, the reflecting film 180 is disposed in an upper portion of a space between the light guide plate 125 and the LED array 160 to prevent light leakage through the upper portion of the space. The reflecting film 180 has a size corresponding to the upper portion of the space and faces into the reflecting plate 130. For example, one side of the reflecting film 180 is interposed between the light guide plate 125 and the plurality of optic films 135 and the opposite side of the reflecting film 180 is disposed over an upper surface of the LED array 160. In another embodiment, the one side may be interposed between the plurality of optic films 135. Accordingly, light toward the upper portion of the space is not absorbed by the guide panel 175 but is reflected on the reflecting film 180 and the reflected light re-enters the light guide plate 125. The reflecting film 180 may include the same material as the reflecting plate 130. In addition, the reflecting film 180 may be disposed on one of the light guide plate 125 and the LED array 160. Alternatively, the reflecting film 180 may be fixed with a fixing means such as a double-sided adhesive tape.

As a result, the LED array 160 is substantially completely surrounded by the reflecting plate 130, a side surface of the light guide plate 125, the reflecting film 180 and the guide panel 145.

Figure 1:
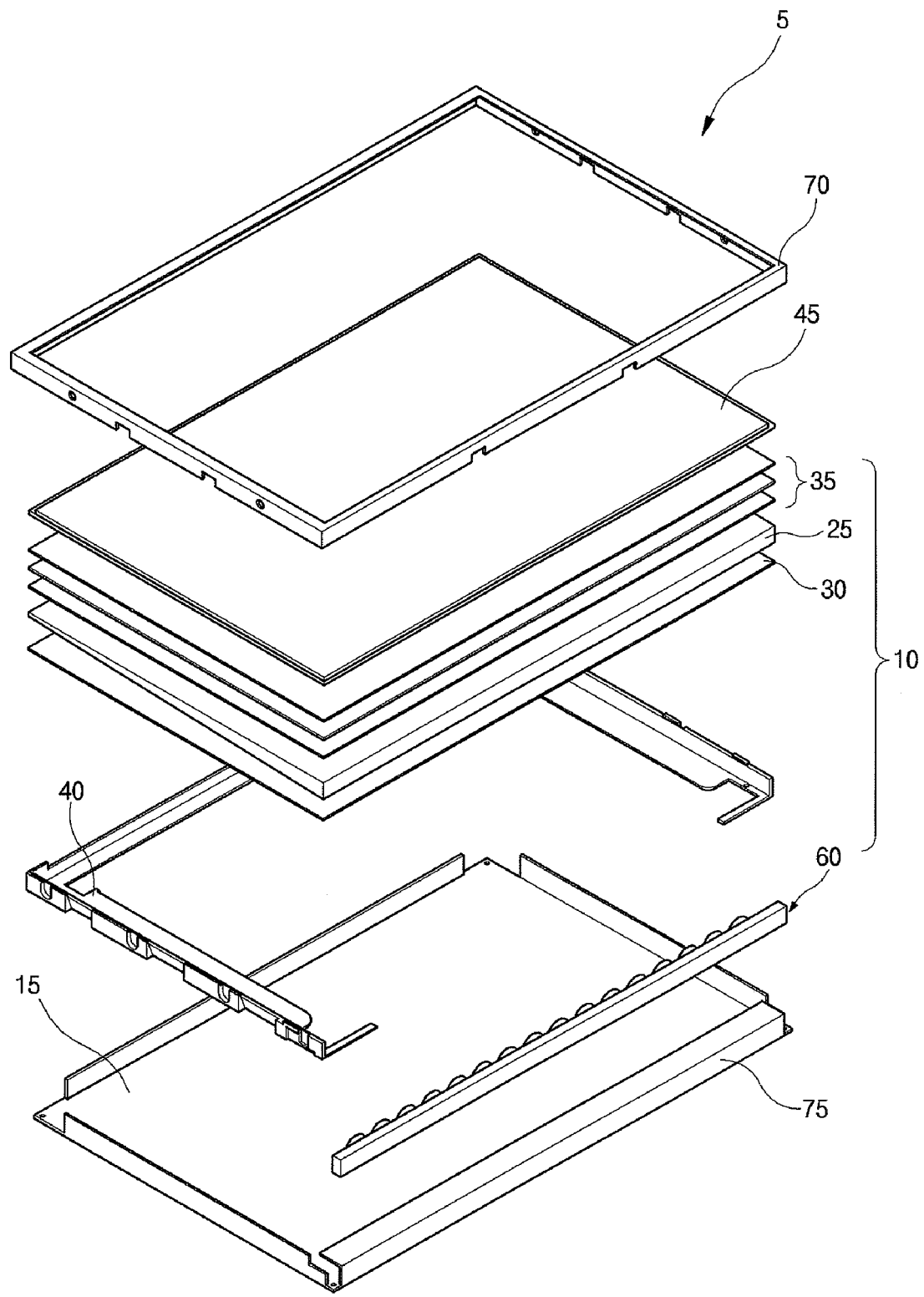
FIG. 1 is an exploded perspective view illustrating a liquid crystal display module according to the related art.
Figure 2A:
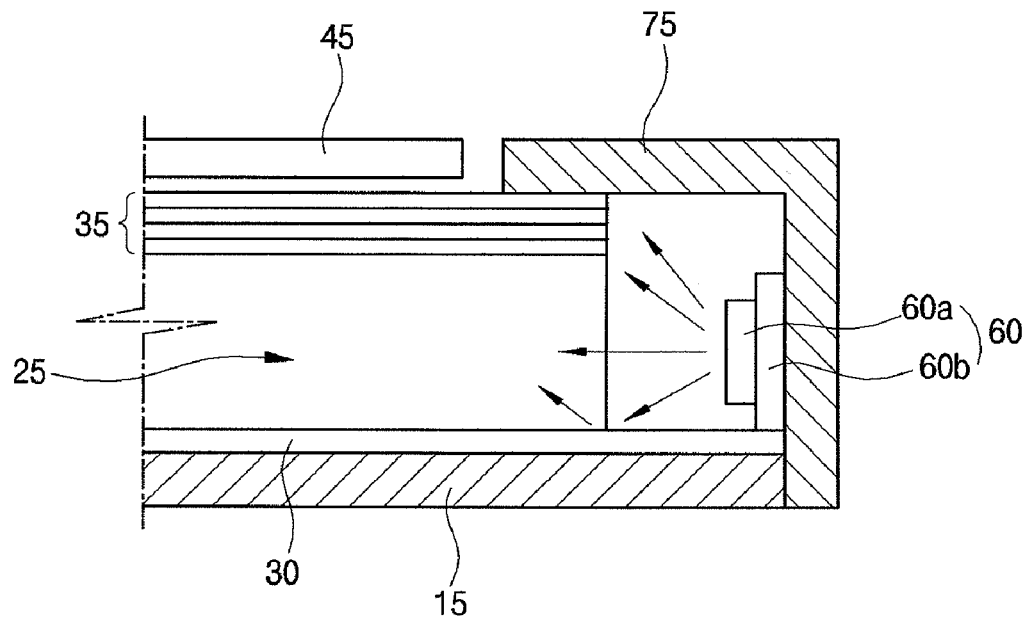
FIG. 2A is a cross-sectional view illustrating a liquid crystal display module having an LED backlight unit according to the related art.
Figure 2B:
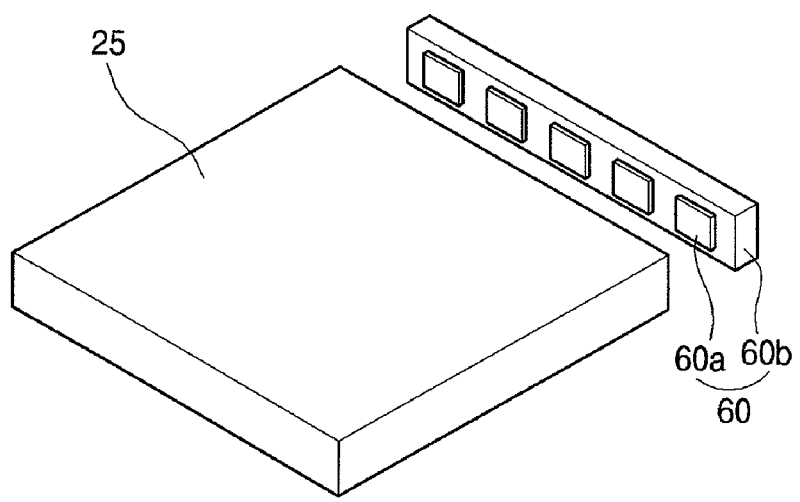
FIG. 2B is a perspective view illustrating an LED backlight unit according to the related art.
Figure 3:
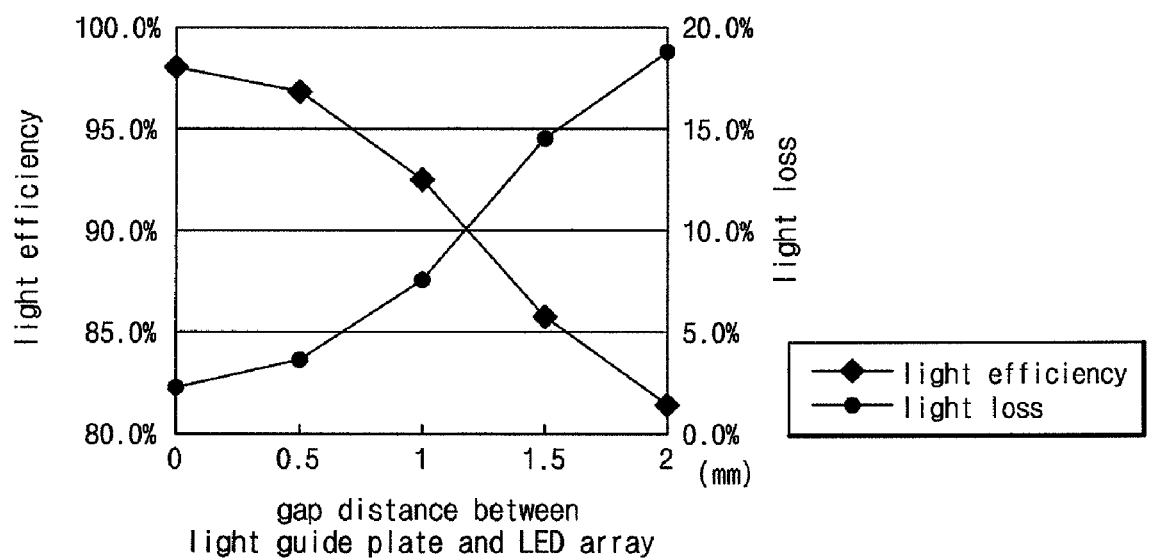
FIG. 3 is a graph illustrating light efficiency and light loss of an LED backlight unit according to the related art.
Figure 5:
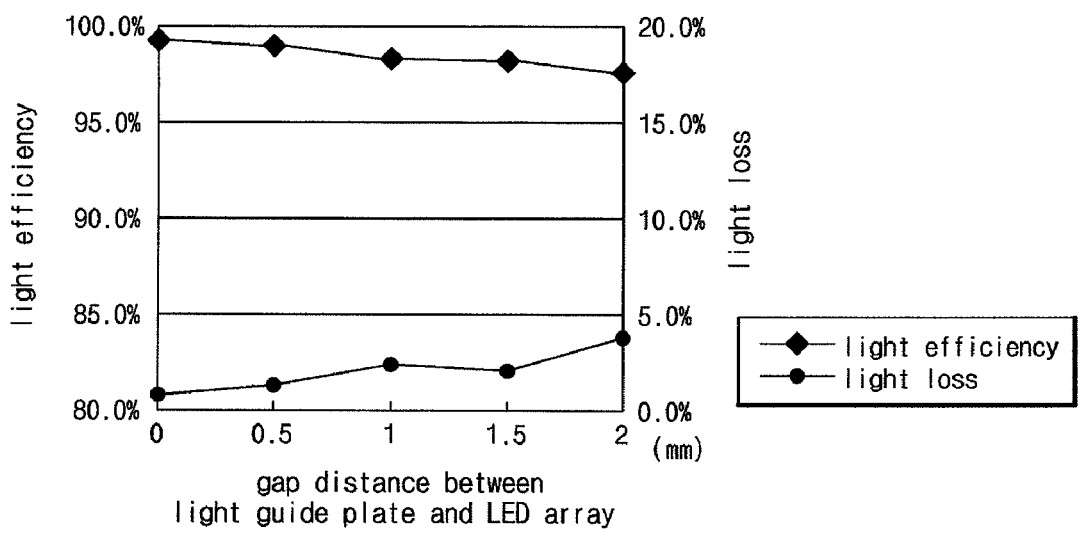
FIG. 5 is a graph illustrating light efficiency and light loss of an LED backlight unit according to a first embodiment.

FIG. 5 is a graph illustrating light efficiency and light loss of an LED backlight unit according to a first embodiment. In FIG. 5, a horizontal axis represents a gap distance between a light guide plate and an LED array, and a vertical axis represents a light efficiency and a light loss. The light efficiency is kept over about 97% in whole range of the gap distance. Further, the light loss is less than about 3% even when the gap distance increases up to about 2.0 mm. The light loss of about 3% corresponds to the gap distance of about 0.5 mm in the LED backlight unit according to the related art of FIG. 3. Since the LED backlight unit designed to have a gap distance within a range of about 0 mm to about 2.0 mm has a light loss within a range of about 0.5% to about 3.0%, the LED backlight unit has a total light loss within a range of about 0.8% to about 3.6% even when an attachment margin within a range of about 0.5 mm to about 1.0 mm is considered. As a result, the light efficiency of the LED backlight unit is improved without increase of the light loss.

In the LED backlight unit according to the first embodiment, the reflecting film covers the upper portion of the space between the light guide plate and the LED array and the light that is scattered at or absorbed by the plurality of optic films and the guide panel is induced to re-enter the light guide plate. Accordingly, the light efficiency of the LED backlight unit is improved.

Figure 6:
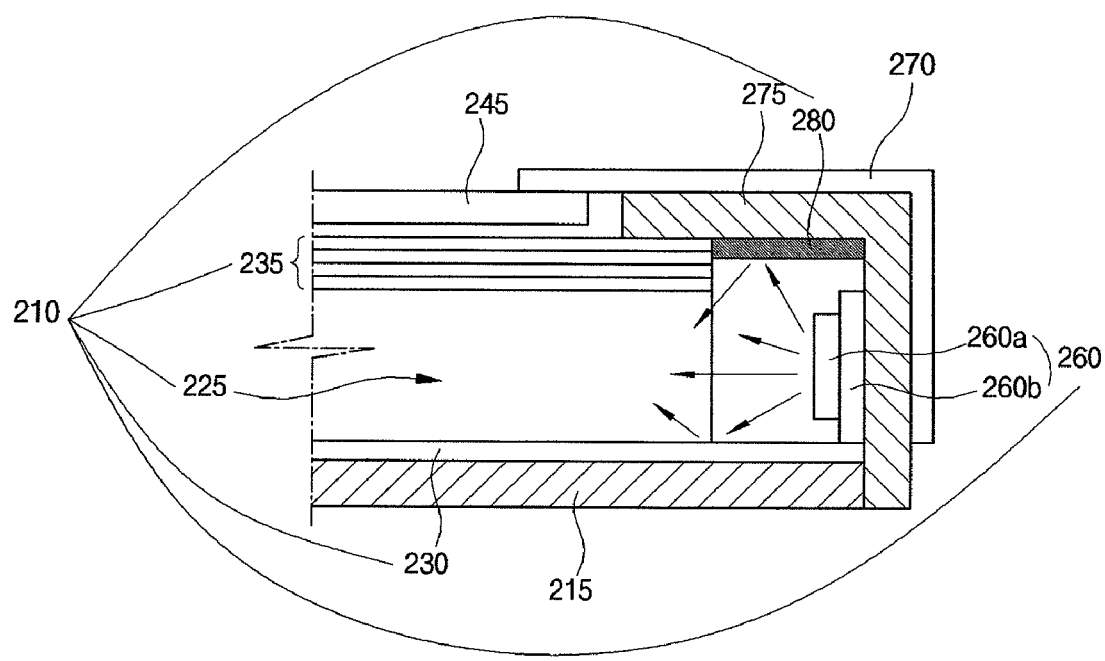
FIG. 6 is a cross-sectional view illustrating a liquid crystal display module according to a second embodiment.

FIG. 6 is a cross-sectional view illustrating a liquid crystal display module according to a second embodiment.

In FIG. 6, a liquid crystal display module includes a liquid crystal display panel 245, a backlight unit 210, a bottom frame 215, a main frame (not shown), a top frame 270 and a guide panel 275. The backlight unit 210 is disposed over the bottom frame 215 and the liquid crystal display panel 245 is disposed over the backlight unit 210. The backlight unit 210 includes a reflecting plate 230, a light guide plate 225, a plurality of optic films 235, a light emitting diode (LED) array 260 and a reflecting film 280. The guide panel 275 surrounds the LED array 260 and the LED array 260 is fixed to the guide panel 275. The guide panel 275 has a bent surface covering edge portions of the plurality of optic films 235. Further, the guide panel 275 is combined with the bottom frame 215. Alternatively, the guide panel 275 may be combined with the main frame in another embodiment. Accordingly, the bottom frame 215 surrounds the reflecting plate 230 of the backlight unit 210 and the liquid crystal display panel 245 is disposed over the plurality of optic films 235. In addition, the main frame surrounds edge portions of the backlight unit 210 and the liquid crystal display panel 245, and the top frame 270 covers top edge portions of the liquid crystal display panel 245. The main frame may be combined with the top frame 270.

The LED array 260 is spaced apart from the light guide plate 225 to minimize an influence of heat from the LED array 260 on the plurality of optic films 235 and prevent a hot spot of the liquid crystal display panel 245. The LED array 260 includes a plurality of LED lamps 260a and an LED printed circuit board (PCB) 260b. The plurality of LED lamps 260a are fixed on the LED PCB 260b and the LED PCB 260b may include a metallic material. The reflecting plate 230 including a reflective material such as aluminum (Al) and aluminum alloy is disposed under the light guide plate 225 and the LED array 260. Light downwardly scattered at the light guide plate 225 is induced to re-enter the light guide plate 225 by the reflecting plate 230. In addition, the reflecting plate 230 extends under the LED array 260 to prevent light leakage, and the guide panel 275 has a bent surface to cover edge portions of the plurality of optic films 235.

Although not shown in FIG. 6, the plurality of optic films 235 may include a diffusing sheet, a prism sheet and a protective sheet. The diffusing sheet scatters light from the light guide plate 225 and the prism sheet concentrates light from the diffusing sheet to supply uniform planar light to a surface of the liquid crystal display panel 245.

Furthermore, the reflecting film 280 is disposed in an inner surface of the guide panel 275 to correspond to an upper portion of a space between the light guide plate 225 and the LED array 260. The reflecting film 280 has a size corresponding to the upper portion of the space and faces into the reflecting plate 230. For example, the reflecting film 280 may have the same width as a gap distance between the light guide plate 225 and the LED array 260. In addition, the reflecting film 280 may adhere to the inner surface of a bent portion of the guide panel 275 using a fixing means such as a double-sided adhesive tape such that one side of the reflecting film 280 contacts the plurality of optic films 235 and the opposite side of the reflecting film 280 contacts the guide panel 275. Accordingly, light toward the upper portion of the space is not absorbed by the guide panel 275 but is reflected on the reflecting film 280, and the reflected light re-enters the light guide plate 225. The reflecting film 280 may include the same material as the reflecting plate 230. As a result, the LED array 260 is substantially completely surrounded by the reflecting plate 230, a side surface of the light guide plate 225, the reflecting film 280 and the guide panel 245. Accordingly, light leakage through the upper portion of the space is prevented and light efficiency is improved without increase of light loss.

A reflecting film is formed to correspond to an upper portion of a space between a light guide plate and an LED array and light efficiency of an LED backlight unit is improved by the reflecting film. In addition, although a reflecting film is applied to an LED backlight including an LED lamp unit in the first and second embodiments, a light efficiency of a backlight unit including a fluorescent lamp such as a cold cathode fluorescent lamp (CCFL) and an external electrode fluorescent lamp (EEFL) may be improved by forming a reflecting film in the backlight unit in another embodiment. Accordingly, a reflecting film may be formed to correspond to an upper portion of a space between a light guide plate and a fluorescent lamp in the backlight unit.

It will be apparent to those skilled in the art that various modifications and variations can be made in a backlight unit and a liquid crystal display module including the same of the present invention without departing from the spirit or scope of the invention. Thus, it is intended that the present invention covers the modifications and variations of this invention provided they come within the scope of the appended claims and their equivalents.

What is claimed is:

1. A backlight unit, comprising:
a reflecting plate;
a light guide plate disposed over the reflecting plate;
a plurality of optic films disposed over the light guide plate;
a light emitting diode (LED) array horizontally spaced apart from the light guide plate, wherein the LED array includes a printed circuit board (PCB) and a plurality of LED lamps on the PCB, and the plurality of LED lamps are spaced apart from each other; and
a reflecting film corresponding to an upper portion of a space between the light guide plate and the LED array, wherein a first side of the reflecting film overlaps the plurality of optic films and is interposed between the light guide plate and the plurality of optic films, and wherein a second side of the reflecting film contacts a side of the PCB.

2. The backlight unit according to claim 1, wherein the reflecting plate extends under the LED array.

3. A backlight unit, comprising:
a reflecting plate;
a light guide plate disposed over the reflecting plate;
a plurality of optic films disposed over the light guide plate;
a light emitting diode (LED) array horizontally spaced apart from the light guide plate, wherein the LED array includes a printed circuit board (PCB) and a plurality of LED lamps on the PCB, and the plurality of LED lamps are spaced apart from each other; and
a reflecting film corresponding to an upper portion of a space between the light guide plate and the LED array; and
a guide panel that surrounds the LED array, wherein a first side of the reflecting film contacts a side of the plurality of optic films, and wherein a second side of the reflecting film is spaced apart from a side of the PCB.

4. The backlight unit according to claim 3, wherein a width of the reflecting film is substantially the same as a gap distance between the light guide plate and the LED array.

5. The backlight unit according to claim 4, wherein the reflecting film adheres to the guide panel.

6. A liquid crystal display module, comprising:
a backlight unit, the backlight unit comprising:
a reflecting plate;
a light guide plate disposed over the reflecting plate;
a plurality of optic films disposed over the light guide plate;
a light emitting diode (LED) array horizontally spaced apart from the light guide plate, wherein the LED array includes a printed circuit board (PCB) and a plurality of LED lamps on the PCB, and the plurality of LED lamps are spaced apart from each other; and
a reflecting film corresponding to an upper portion of a space between the light guide plate and the LED array, wherein a first side of the reflecting film overlaps the plurality of optic films and is interposed between the light guide plate and the plurality of optic films, and wherein a second side of the reflecting film contacts a side of the PCB.

7. The liquid crystal display module according to claim 6, further comprising:
a bottom frame, the backlight unit disposed over the bottom frame;
a guide panel that surrounds the LED array;
a main frame that surrounds the backlight unit and combined with the bottom frame;
a liquid crystal display panel disposed over the backlight unit; and
a top frame that covers a top edge portion of the liquid crystal display panel and combined with the main frame.

8. The liquid crystal display module according to claim 6, wherein the LED array is substantially completely surrounded by the reflecting plate, a side surface of the light guide plate, the reflecting film and the guide panel.

9. The liquid crystal display module according to claim 6, wherein the reflecting plate extends under the LED array.

10. A liquid crystal display module, comprising:
a backlight unit, the backlight unit comprising:
a reflecting plate;
a light guide plate disposed over the reflecting plate;
a plurality of optic films disposed over the light guide plate;
a light emitting diode (LED) array horizontally spaced apart from the light guide plate, wherein the LED array includes a printed circuit board (PCB) and a plurality of LED lamps on the PCB, and the plurality of LED lamps are spaced apart from each other; and
a reflecting film corresponding to an upper portion of a space between the light guide plate and the LED array; and
a guide panel that surrounds the LED array, wherein a first side of the reflecting film contacts a side of the plurality of optic films, and wherein a second side of the reflecting film is spaced apart from a side of the PCB.

11. The liquid crystal display module according to claim 10, wherein a width of the reflecting film is substantially the same as a gap distance between the light guide plate and the LED array.

12. The liquid crystal display module according to claim 11, wherein the reflecting film adheres to the guide panel.

* * * * *